(12) United States Patent
Sun

(10) Patent No.: US 8,526,304 B2
(45) Date of Patent: Sep. 3, 2013

(54) PROCESSING METHOD FOR RESOURCE REQUEST IN NGN

(75) Inventor: Mo Sun, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 664 days.

(21) Appl. No.: 12/808,776

(22) PCT Filed: Dec. 20, 2007

(86) PCT No.: PCT/CN2007/003706
§ 371 (c)(1),
(2), (4) Date: Jun. 17, 2010

(87) PCT Pub. No.: WO2009/079844
PCT Pub. Date: Jul. 2, 2009

(65) Prior Publication Data
US 2010/0304775 A1 Dec. 2, 2010

(51) Int. Cl.
*H04L 12/28* (2006.01)

(52) U.S. Cl.
USPC ........................................................ 370/229

(58) Field of Classification Search
None
See application file for complete search history.

(56) References Cited

U.S. PATENT DOCUMENTS

| | | | | |
|---|---|---|---|---|
| 6,381,228 B1 * | 4/2002 | Prieto et al. | .................... | 370/323 |
| 7,647,406 B2 * | 1/2010 | Liu | ................ | 709/226 |
| 7,769,875 B1 * | 8/2010 | Moisand et al. | ............. | 709/229 |
| 8,027,681 B2 * | 9/2011 | Burgess et al. | ............... | 455/436 |
| 8,031,603 B1 * | 10/2011 | Polk et al. | ..................... | 370/235 |
| 8,111,695 B2 * | 2/2012 | Van Ewijk et al. | ........... | 370/392 |
| 2003/0123388 A1 | 7/2003 | Bradd | | |
| 2007/0081459 A1 | 4/2007 | Segel et al. | | |
| 2007/0116004 A1 | 5/2007 | Kang et al. | | |

FOREIGN PATENT DOCUMENTS

| | | |
|---|---|---|
| CN | 1691636 A | 11/2005 |
| CN | 1832448 A | 9/2006 |
| CN | 1889566 A | 1/2007 |
| CN | 1992628 A | 7/2007 |
| CN | 101009695 A | 8/2007 |

OTHER PUBLICATIONS

Zhao et al. "N-G, N of R the ACF Technology and its Application of", Telecommunications Technology 2006, vol. 7, p. 13-18, The non-English language reference is accompanied by a machine translation of a portion of the reference to the English language, All together 7 Pages.
International Search Report for PCT/CN2007/003706, Prepared by the Chinese Patent Office, Dated Sep. 10, 2008, 4 Pages.

* cited by examiner

*Primary Examiner* — Gregory Sefcheck
(74) *Attorney, Agent, or Firm* — Brooks Kushman P.C.

(57) ABSTRACT

A processing method for the resource request in NGN, which includes the following steps: the service control layer in NGN transmits the corresponding resource request to the resource admission control layer after the service control layer receives the service request transmitted by an user; if the bandwidth applied by the resource request can not be satisfied, then the resource admission control layer adds the available bandwidth information into the corresponding resource request refusing message and transmits it to the service control layer when the resource admission control layer refuses the request. The service control layer and the user perform session negotiation of the corresponding service according to the available bandwidth information. The method can optimize QoS resource control, acquire the current resource status when the service control function is failed for resource application, negotiate QoS once again according to the current resource status, in order to performing service access rapidly and high effectively, thereby providing better service for users.

8 Claims, 6 Drawing Sheets

PROCESSING METHOD FOR RESOURCE REQUEST IN NGN

CROSS-REFERENCE TO RELATED APPLICATION

This application is the U.S. national phase of PCT Application No. PCT/CN2007/003706 filed Dec. 20, 2007, the disclosure of which is incorporated in its entirety by reference herein.

TECHNICAL FIELD

The present invention relates to communication field, and in particular, to a processing method for resource application in Next Generation Network (NGN).

BACKGROUND OF THE INVENTION

In NGN (Next Generation Network), the difficulty in ensuring quality of service (QoS) of a service is increased because the bearer network adopts packet technology, especially IP (Internet Protocol) technology.

In order to ensure the QoS of a service, the concept of resource and admission control and its corresponding function entity are incorporated into NGN. Resource and admission control is located between a service control layer and access/bearer layer for shielding specific access/bearer layer technology and topology information from entering the service control layer, and implementing that resource and admission control related functional entities receive service related QoS request from the service control layer, combine it with admission control policy, topology information of the network and so on, and convert the service QoS information into IP QoS information which is transmitted to related access/bearer layer node and service gateway node, then these nodes achieve corresponding QoS control according to the received information and their own functions.

ITU-T (ITU-Telecommunication Standardization Sector) and ETSI (European Telecommunication Standards Institute) are two organizations that are dedicated to setting NGN technology standards, and regarding resource and admission control, they put forward RACF (Resource and Admission Control Function) and RACS (Resource and Admission Control Subsystem) respectively.

Although scopes of the drafts of the resource and admission control systems of the two organizations are different and definitions on some specific function entities are not exactly same, their frames are similar and compatible.

In the draft regarding RACF, the ITU-T provides a functional frame of RACF as shown in FIG. 1.

FIG. 1 includes the following function entities: SCF (Service Control Function), PD-FE (Policy Decision Function Entity), TRC-FE (Transport Resource Control Function Entity), PE-FE (Policy Execute Function Entity), TRE-FE (Transport Resource Execute Function Entity), NACF (Network Attachment Control Function), CPE (Customer Premises Equipment) and so on.

SCF is used for controlling negotiation on a service layer and initiating a resource request to RACF according to QoS negotiated in the service session.

PD-FE is used for making a preliminary QoS resource decision based on session information of media stream and transport resource subscription information (referred to as subscription information in short) of the user obtained from NACF, then interacting with TRC-FE to confirm whether there is enough QoS resources, making a final decision, and handing the decision down to PE-FE for execution.

TRC-FE is mainly responsible for resource control, monitoring the resources in the network and collecting related information, making a response according to the specific resource status when PD-FE requests resources.

PE-FE is mainly responsible for performing policy control under the direction of PD-FE, such as door control, bandwidth, traffic classification and label, traffic shaping, Layer 2 and Layer 3 QoS mapping, collecting and reporting information about resource use, and so on.

TRE-FE performs Layer 2 policy execution under the directions of TRC-FE.

In a draft of ETSI TISPAN (Telecommunication and Internet converged Services and Protocols for Advanced Networking) regarding RACS, a functional frame of RACS is provided as shown in FIG. 2.

FIG. 2 includes the following function entities: AF (Application Function), SPDF (Service-based Policy Decision Function), x-RACF (generic Resource and Admission Control Function), NASS (Network Attachment Subsystem), BGF (Border Gateway Function), RCEF (Resource Control Enforcement Function), L2TF (Layer 2 Termination Function) and so on.

AF is a service control function for controlling negotiation on a service level and initiating a resource request to RACF according to QoS negotiated in the service session.

SPDF selects a local policy according to the request from the AF, and maps the request to an IP QoS parameter, which is then transmitted to A-RACF and BGF for applying for corresponding resources.

x-RACF is divided into C-RACF (Core-Resource and Admission Control Function) and A-RACF (Access-Resource and Admission Control Function).

A-RACF receives a request from SPDF, and then implements admission control based on the stored policy by accepting or refusing the request for transmitting resources. A-RACF can obtain network attachment information and QoS subscription information of the user (referred to as subscription information in short) from NASS through e4 reference point, thus determining available network resources according to network position information (e.g., the address of the physical node accessing the user terminal), meanwhile referring to the subscription information of the user when processing the resource distribution request.

BGF is located between an access network and a core network for implementing core border gateway function; it can also be used as a gateway between two core networks. BGF implements functions such as NAT, gate control, QoS label, bandwidth restriction, use measurement, resource synchronization and so on under the control of SPDF.

RCEF implements functions including gate control, QoS label and bandwidth restriction by Layer 2/Layer 3 (L2/L3) media steam policy defined by an accessed operator transmitted via Re reference point.

L2FT is a function entity terminating Layer 2 connection in the access network. RCEF and L2TF are two different logical function entities that can be usually implemented in one physical equipment.

In a NGN system, the current process of QoS negotiation of the session service is as follows: firstly, QoS negotiation of a service is performed on a service control layer, and then SCF/AF initiates a resource request to RACF/RACS according to the negotiated QoS of the service, RACF/RACS makes an admission decision according to the subscription information of the user and the current status of available resources; if it can be admitted, then the policy is handed down to the policy execute entity in the transmission layer; if the total of the requested resources and the resources that have been used by the user exceeds the resources subscribed by the user, or the requested resources exceed the currently allocatable resources, then the resource request of SCF/AF will be refused.

FIG. 3 is an illustration for the flow in which a resource request of a service is refused in the prior art, and it specifically comprises the following steps of:

301: CPE/UE initiating a service request to SCF/AF, the request containing expected QoS information;

The above QoS information comprises: upstream bandwidth, downstream bandwidth, priority and so on.

302: if the QoS of the service request can be accepted by the service layer, SCF/AF initiating a resource request to RACF/RACS according to QoS requested by the user;

303: if RACF/RACS does not have subscription information of the user, RACF/RACS interacting with NACF/NASS to obtain subscription information of the user;

304: RACF/RACS making an admission decision in response to the request according to the subscription information and the current status of available resources; if the total of the requested bandwidth and the bandwidth which has been used by the user exceeds the resources subscribed by the user, or the requested bandwidth exceeds the currently distributable bandwidth in the equipment on the transmission layer, then the resource request will be refused;

305: RACF/RACS transmitting a resource request refusing message to SCF/AF to refuse the resource request;

306: SCF/AF transmitting a service request refusing message to CPE/UE to refuse the service request; and 307: initiating service session negotiation again between CPE/UE and SCF/AF if necessary.

It can be seen from above that since the current RACF/RACS only returns a related error code when there are not enough resources to inform SCF/AF of the reasons for refusing a resource request, SCF/AF can only blindly negotiate with the user again, making resource requests repeatedly, or speculatively reduces requirement on resources to apply for less resources because the specific status of resources has been shielded by RACF/RACS although it knows that the resource request is refused due to lack of resources.

Using a method repeatedly making resource requests, the application cannot succeed until other applications release resources; using a method of speculatively reducing requirement on resources, it is impossible to know to what extent the requirement has to be reduced in order to successfully applying for resources, since no basis can be used as a reference, therefore efforts may be made for many times in order to successfully applying for resources, which is much less efficient.

SUMMARY OF THE INVENTION

The technical problem to be solved in the present invention is to overcome the drawbacks of the prior art by providing a method for resource and admission control function to process a resource request in a case of insufficient resources to enable user equipment and service control function to apply for resources again highly efficiently.

In order to solve the above problem, the present invention provides a method for processing a resource request in NGN, comprising: after receiving a service request sent by a user, a service control layer in NGN sending a corresponding resource request to a resource and admission control layer; and if a bandwidth applied in the resource request cannot be satisfied, the resource and admission control layer including available bandwidth information into a corresponding resource request refusing message when refusing the request, and transmitting the resource request refusing message to the service control layer.

Additionally, the service control layer and the user perform session negotiation on the corresponding service according to the available bandwidth information.

Additionally, if the resource request cannot be satisfied only with remaining subscription bandwidth of the user, the available bandwidth information comprises: a bandwidth value of the remaining subscription bandwidth;

If the resource request cannot be satisfied only with distributable bandwidth of the transmission layer, the available bandwidth information comprises: a bandwidth value of the distributable bandwidth of the transmission layer;

If the resource request cannot be satisfied with both remaining subscription bandwidth of the user and distributable bandwidth of the transmission layer, the available bandwidth information comprises: a bandwidth value of the remaining subscription bandwidth and a bandwidth value of the distributable bandwidth of the transmission layer, or the minimum bandwidth value among the bandwidth value of the remaining subscription bandwidth and the bandwidth value of the distributable bandwidth of the transmission layer.

Additionally, the remaining subscription bandwidth comprises: remaining upstream subscription bandwidth and remaining downstream subscription bandwidth; the distributable bandwidth of the transmission layer comprises: upstream distributable bandwidth of the transmission layer and downstream distributable bandwidth of the transmission layer.

Additionally, the service control layer is a service control function (SCF), and the resource and admission control layer is a resource and admission control function (RACF) system;

Before the resource request refusing message is transmitted to the SCF, the method comprises the following steps of:

A: after receiving the service request initiated by the user, SCF transmitting a corresponding resource request to policy decision-function entity (PD-FE) of the RACF system;

B: PD-FE obtaining subscription information of the user and judging whether the resource request can be satisfied or not according to the subscription information; if the remaining subscription bandwidth of the user is smaller than the bandwidth required by the resource request, then including the remaining subscription bandwidth in the resource request refusing message as available bandwidth information.

Additionally, the service control layer is a SCF, and the resource and admission control layer is a RACF system;

Before the resource request refusing message is transmitted to SCF, the method comprises the following steps of:

A1: after receiving the service request initiated by the user, SCF transmitting a corresponding resource request to PD-FE of the RACF system;

B1: PD-FE obtaining subscription information of the user and transmitting a transmission layer resource request corresponding to the resource request to a TRC-FE of the RACF system;

C1: if the distributable bandwidth of the transmission layer cannot satisfy the transmission layer resource request, TRC-FE including bandwidth value of the distributable bandwidth of the transmission layer into a transmission layer resource request response, and then transmitting the transmission layer resource request response to PD-FE;

D1: if the remaining subscription bandwidth of the user is smaller than a bandwidth required by the resource request, then PD-FE including the remaining subscription bandwidth of the user, or both the remaining subscription bandwidth of the user and the distributable bandwidth of the transmission layer, or the minimum value among the remaining subscription bandwidth and the distributable bandwidth of the transmission layer into the resource request refusing message as available bandwidth information; otherwise, PD-FE including the distributable bandwidth of the transmission layer into the resource request refusing message as available bandwidth information.

Additionally, the service control layer is an AF, and the resource and admission control layer is a RACS system;

before the resource request refusing message is transmitted to AF, the method comprises the following steps of:

a) after receiving the service request initiated by the user, AF transmitting a corresponding resource request to an A-RACF through a SPDF of the RACS system;

b) A-RACF making an admission decision according to subscription information of the user and resource status of the transmission layer;

If the remaining subscription bandwidth of the user cannot satisfy the resource request, or currently distributable bandwidth of the transmission layer cannot satisfy the resource request, then including the minimum bandwidth value among the remaining subscription bandwidth of the user and the distributable bandwidth of the transmission layer in the resource request refusing message as available bandwidth information;

If the remaining subscription bandwidth of the user cannot satisfy the resource request, and the currently distributable bandwidth of the transmission layer cannot satisfy the resource request, then including both the remaining subscription bandwidth of the user and the distributable bandwidth of the transmission layer, or the minimum bandwidth value among the remaining subscription bandwidth of the user and the distributable bandwidth in the resource request refusing message as available bandwidth information.

Additionally, after receiving the resource request refusing message, the service control layer determines quality of service (QoS) parameters according to the available bandwidth information and initiates session negotiation corresponding to the service request.

Additionally, after receiving the resource request refusing message, the service control layer transmits the resource request refusing message containing the available bandwidth information to the user; the user determines QoS parameters according to the available bandwidth information and initiates session negotiation corresponding to the service request.

To sum up, in the method of the present invention, QoS resource control can be optimized, the current resource status can be acquired when service control function fails in resource application, and negotiation on QoS can be restarted according to the current resource status, so as to perform service access rapidly and efficiently and to provide better services for the user.

PREFERRED EMBODIMENTS OF THE INVENTION

The main idea of the present invention is that when refusing a resource request, policy decision function includes the information about currently available bandwidth for the user into a corresponding responding message, and after receiving the responding message, service control function initiates session negotiation again according to the information about currently available bandwidth for the user.

The present invention will be further described in detail with reference to the drawings and examples.

Example 1

Subscription Bandwidth of a User is Insufficient in a RACF System

Figure 1:
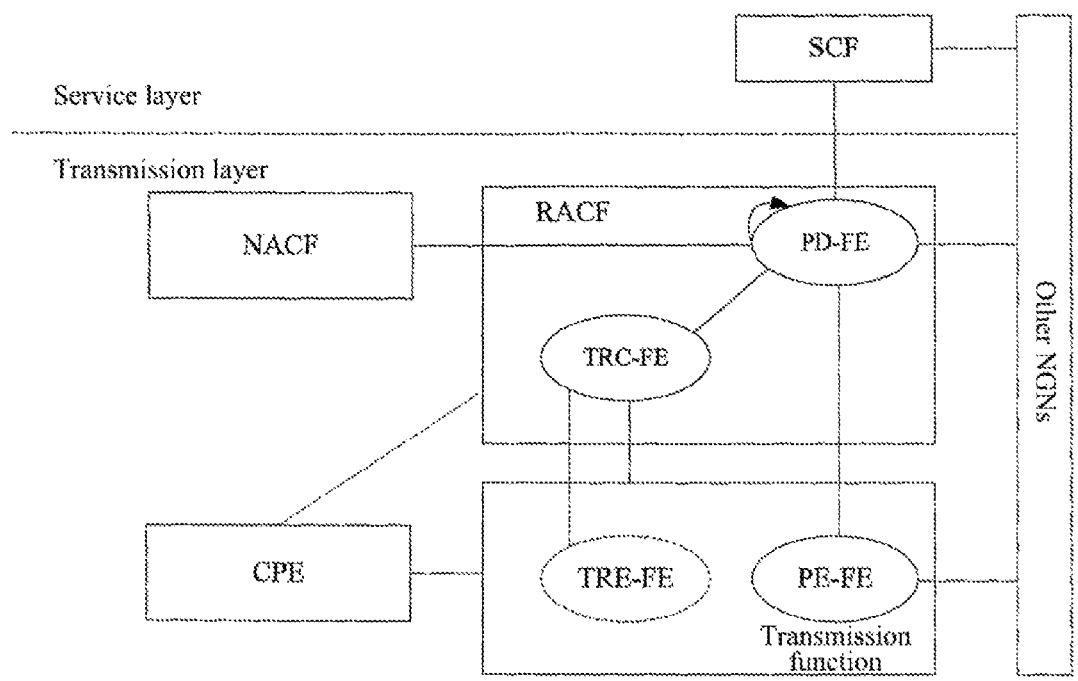
FIG. 1 is a frame chart of RACF of ITU-I.
Figure 2:
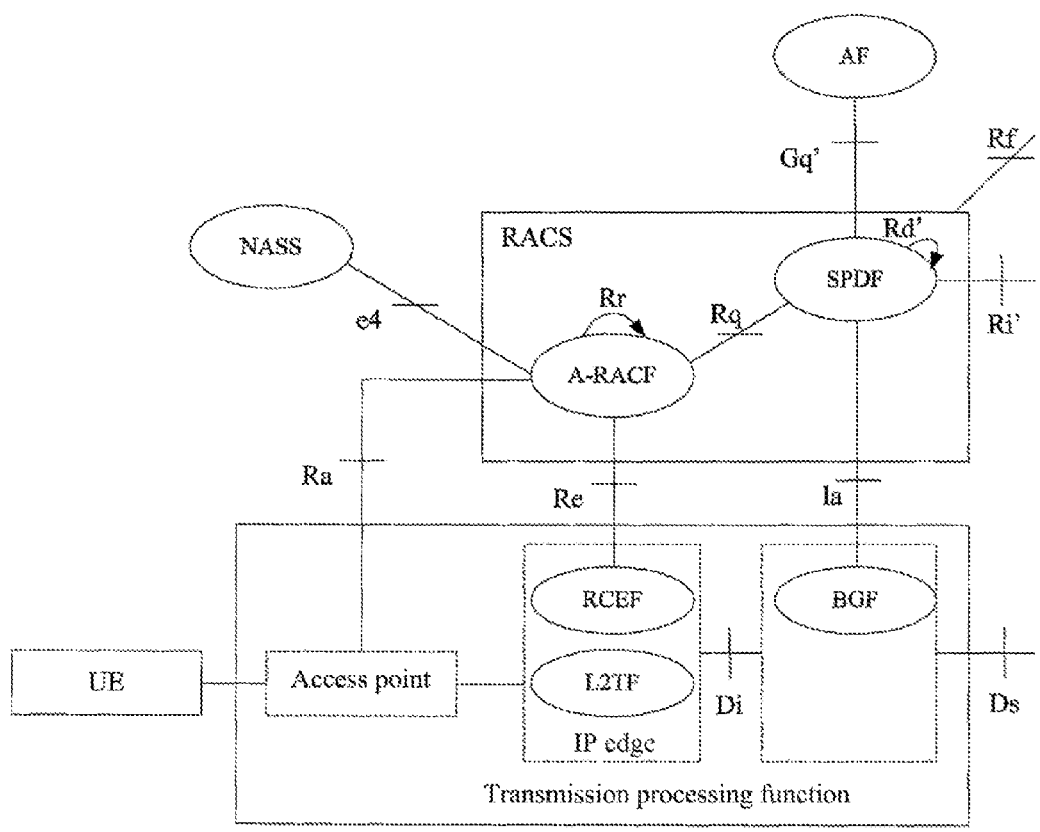
FIG. 2 is a frame chart of RACS of ETSI.
Figure 3:
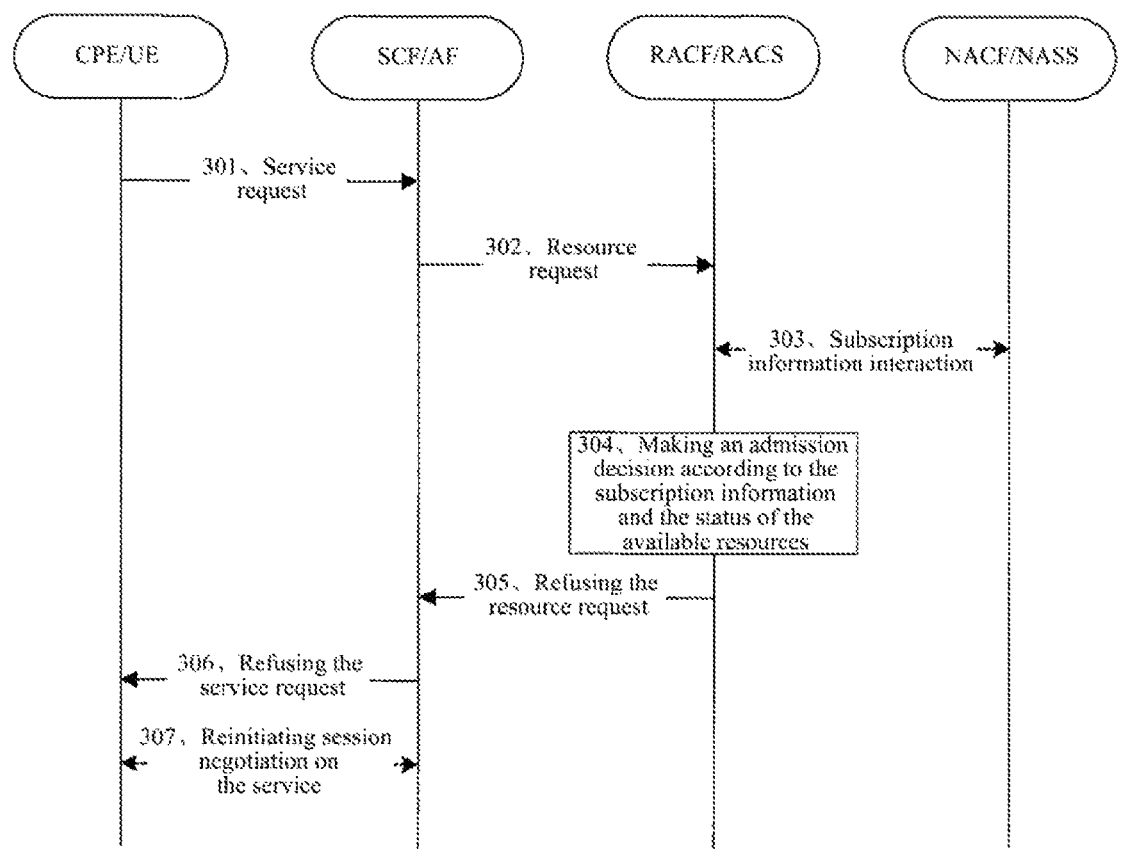
FIG. 3 is an illustration of the flow in which a resource request of a service is refused in the prior art.
Figure 4:
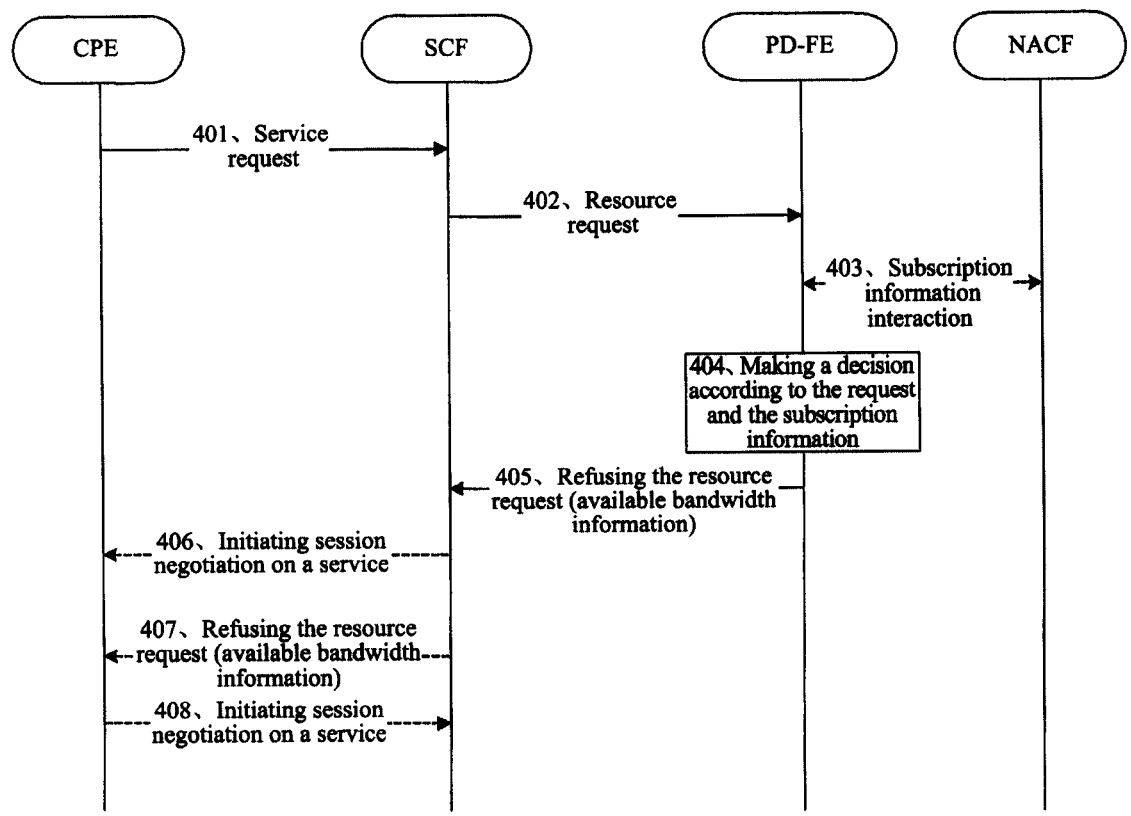
FIG. 4 is a flow of the method for processing a resource request when the subscription bandwidth of the user is insufficient in a RACF system according to an example of the present invention.

FIG. 4 is the flow chart of a method for processing a resource request when the subscription bandwidth of a user is insufficient in a RACF system according to an example of the present invention.

In a RACF system, when SCF applies to PD-FE for resources for a certain service of a user, if PD-FE finds that the total of the bandwidth applied this time and the bandwidth which has been used by the user exceeds the total bandwidth subscribed by the user, then the currently available bandwidth information of the user needs to be carried in the resource request refusing message to be transmitted to SCF; after receiving the refusing message, SCF can have session negotiation with the user again according to the available bandwidth information contained in the message, or it can also include the available bandwidth information into the service request refusing message to be transmitted to the user, the user decides whether to perform session negotiation again or not and determine the related QoS parameters again.

As shown in FIG. 4, the method comprises the following steps of:

401: CPE initiating a service request to SCF, wherein the corresponding service request message containing its expected QoS information;

402: if the service layer can accept the QoS requested by the user, SCF initiating a resource request to PD-FE of a RACF system according to the QoS requested by the user;

403: if PD-FE does not have the subscription information of the user, PD-FE interacting with NACF to obtain the subscription information of the user;

404: PD-FE making a decision according to the above resource request and the subscription information of the user:

if PD-FE finds that the total of the upstream/downstream bandwidth applied in the resource request corresponding to the service request and the upstream/downstream bandwidth which has been used by the user exceeds the total upstream/downstream bandwidth subscribed by the user, i.e., the remaining bandwidth of the user is insufficient, then PD-FE refuses the resource request.

405: PD-FE initiating a resource request refusing message to SCF to refuse the resource request;

An extended field is contained in the resource request refusing message for carrying the currently available bandwidth information of the user (including the upstream bandwidth and the downstream bandwidth). Of course, the above available bandwidth information can also be carried by the extension parameter in the message.

In other words, in this example, the remaining subscription bandwidth of the user (including the remaining upstream subscription bandwidth and the remaining downstream subscription bandwidth) is transmitted to SCF as available bandwidth information.

406: after receiving the above resource request refusing message, SCF obtaining the currently available bandwidth information of the user contained in the message, and determining the QoS parameters again and reinitiating session negotiation according to the information, this flow ending.

Besides reinitiating session negotiation according to the available bandwidth information after receiving the above resource request refusing message, SCF can also refuse the service request of the user, which comprises the following steps 407 and 408 specifically:

407: after receiving the above resource request refusing message, SCF extracting the currently available bandwidth information of the user contained in the message and including the information into the service request refusing message, and then transmitting the message to CPE;

Similarly, the above available bandwidth information can be carried by an extended field or extension parameter of the service request refusing message.

408: after receiving the above service request refusing message, CPE determining the QoS parameters again and reinitiating session negotiation according to the currently available bandwidth information contained in the message.

Example 2

Bandwidth of the Transmission Layer is Insufficient in a RACF System

Figure 5:
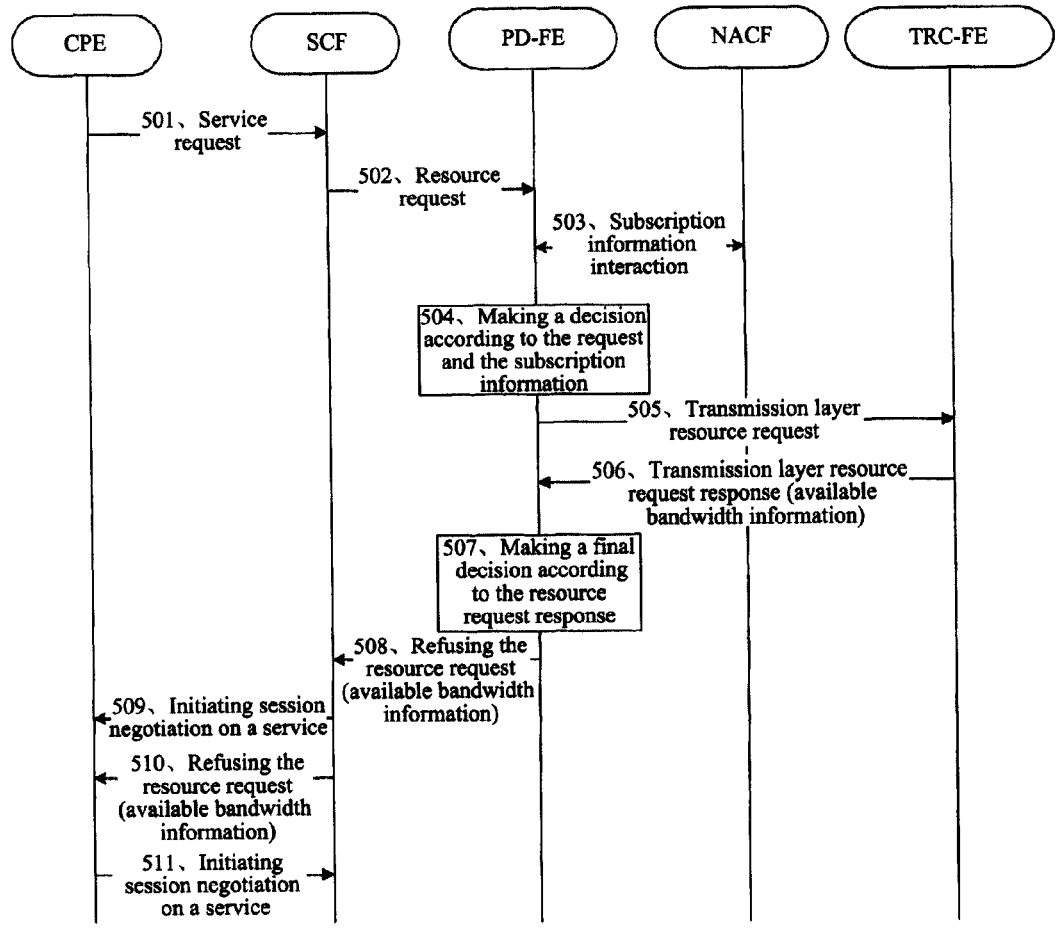
FIG. 5 is a flow of the method for processing a resource request when the bandwidth of the transmission layer is insufficient in a RACF system according to an example of the present invention.

FIG. 5 is a flow of the method for processing a resource request when the bandwidth of the transmission layer is insufficient in a RACF system according to an example of the present invention.

In a RACF system, when SCF applies to PD-FE for resources for a certain service of a user, if the current remaining subscription bandwidth of the user can satisfy the resource request, then PD-FE will initiate a transmission layer resource request to TRC-FE; if TRC-FE finds that the currently distributable bandwidth of the transmission layer equipment is not enough to satisfy the resource request, TRC-FE includes the upstream/downstream bandwidth that can be distributed to the user (collectively called as distributable bandwidth) into the transmission layer resource request responding message, and transmits the message to PD-FE; PD-FE makes a final decision according to the above responding message, and includes the above distributable bandwidth as the currently available bandwidth information of the user into the resource request refusing message, and transmits the message to SCF.

As shown in FIG. 5, the method comprises the following steps of:

501~503: same with steps 401~403 respectively.

504: PD-FE making a decision according to the resource request and the subscription information of the user:

if the QoS level of the resource request is not higher than the QoS level subscribed by the user, and meanwhile the remaining subscription bandwidth of the user is larger than the bandwidth currently requested, then it will further request for transmission layer resources.

505: PD-FE transmitting a transport layer resource request message to TRC-FE;

506: TRC-FE making a judgment according to the current resource status of the transmission layer:

if the distributable bandwidth of the transmission layer is smaller than the requested bandwidth, then the request is refused, and the distributable bandwidth of the transmission layer (including transmission layer upstream distributable bandwidth and transmission layer downstream distributable bandwidth that can be distributed to be used by the user/service) is carried in the corresponding transmission layer resource request response.

507: after receiving the above transmission layer resource request response, PD-FE making a final decision and refusing the resource request;

508: PD-FE transmitting a resource request refusing message to SCF and transmitting the distributable bandwidth contained in the above transmission layer resource request response to SCF as the currently available bandwidth information of the user;

509: after receiving the above resource request refusing message, SCF extracting the currently available bandwidth information of the user contained in the message, determining the QoS parameters again and reinitiating session negotiation according to the information, this flow ending.

Besides reinitiating session negotiation according to the available bandwidth information after receiving the above resource request refusing message, SCF can also refuse the service request of the user, which comprises the following steps 510 and 511 specifically:

510: after receiving the above resource request refusing message, SCF extracting the currently available bandwidth information of the user contained in the message and including the information into the service request refusing message, and then transmitting the message to CPE;

Similarly, the above available bandwidth information can be carried by an extended field or extension parameter of the service request refusing message.

511: after receiving the above service request refusing message, CPE determining the QoS parameters again and reinitiating session negotiation according to the currently available bandwidth information contained in the message.

It should be noted that for a RACF system, its subscription resource detection (step 404, step 504) and transmission resource status detection (step 506) are implemented by PD-FE and TRC-FE respectively, and the transmission resource status detection is performed after subscription resource detection is completed. However, actually, sometimes there is a case in which both the subscription resource and the transmission resource are insufficient.

Therefore, when carrying out the method, PD-FE is also allowed to continue to perform transmission resource status detection when subscription resource detection is not passed (i.e., the remaining subscription bandwidth of the user is insufficient). After the transmission resource status detection is completed, PD-FE performs the following judgment:

if the information contained in the transmission resource request response receive by PD-FE suggests that the currently distributable bandwidth of the transmission layer can satisfy the resource request, PD-FE includes the remaining subscription bandwidth of the user into the resource request refusing message as the currently available bandwidth, and transmits the massage to SCF;

if the information contained in the transmission resource request response receive by PD-FE suggests that the currently distributable bandwidth of the transmission layer cannot satisfy the resource request, PD-FE includes the minimum among the remaining subscription bandwidth of the user and the distributable bandwidth of the transmission layer into the resource request refusing message as the currently available bandwidth information of the user, and transmits the message to SCF.

When both the upstream bandwidth and downstream bandwidth of the above remaining subscription bandwidth as well as the upstream bandwidth and downstream bandwidth of the distributable bandwidth are insufficient, the minimum of the upstream bandwidth and that of the downstream bandwidth are used respectively.

Additionally, after receiving the resource request, PD-FE may also transmit a transmission layer resource request message to TRC-FE firstly before or while obtaining the subscription information of the user and making a decision according to the subscription information.

Example 3

Figure 6:
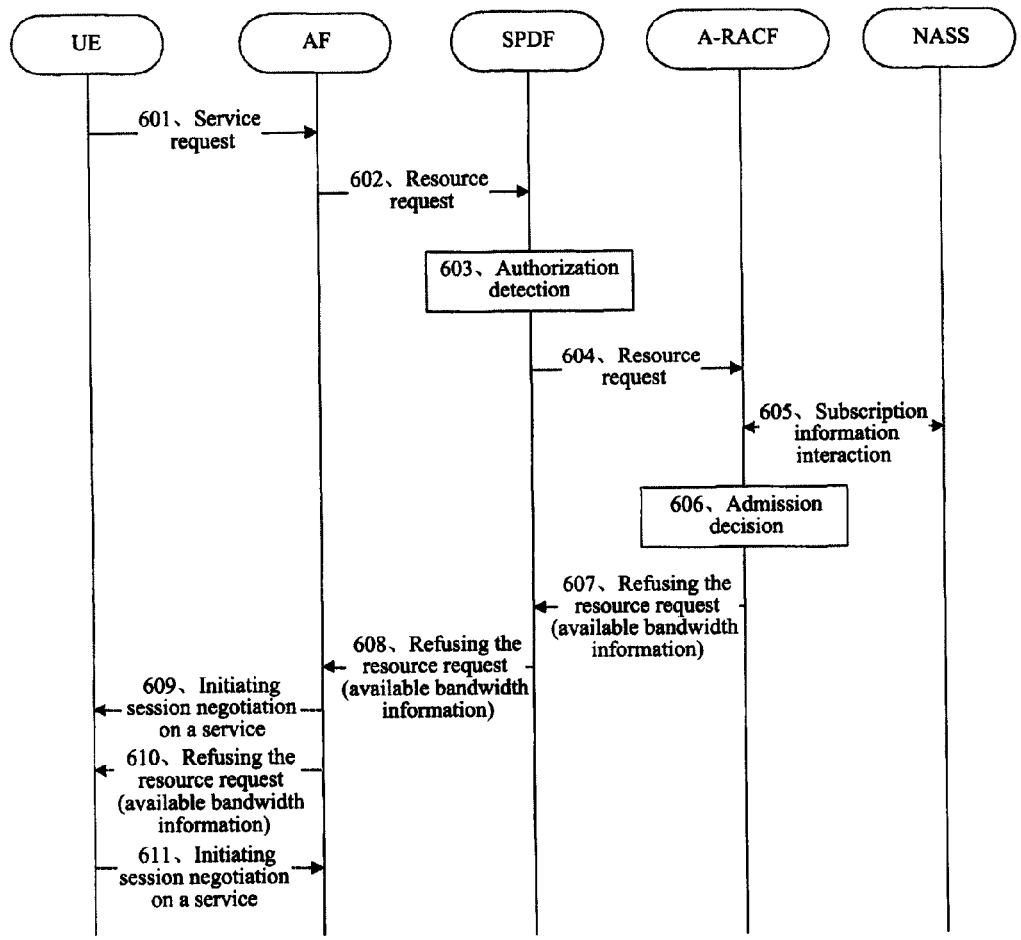
FIG. 6 is a flow of the method for processing a resource request when the subscription bandwidth of the user and/or the bandwidth of the transmission layer are insufficient in a RACS system according to an example of the present invention.

Subscription Bandwidth of a User and/or Bandwidth of the Transmission Layer are Insufficient in a RACS System FIG. 6 is a flow of the method for processing a resource request when the subscription bandwidth of the user and/or the bandwidth of the transmission layer are insufficient in a RACS system according to an example of the present invention. As shown in FIG. 6, the method comprises the following steps of:

601: UE initiating a service request to AF, wherein the corresponding service request message containing its expected QoS information;

602: if the service layer can accept the QoS requested by the user, AF initiating a resource request to SPDF of the RACS system according to the QoS requested by the user;

603: SPDF performing authorization detection on the resource request according to the policy configured by the operator; if the authorization detection is passed, then executing the next step; otherwise, refusing the resource request, this flow ending.

604: SPDF initiating a resource request to A-RACF;

605: after receiving the resource request, A-RACF interacting with NASS to obtain the subscription information of the user if A-RACF does not have the subscription information of the user;

606: A-RACF making an admission decision according to the subscription information of the user and the current resource status of the transmission layer:

if the remaining subscription bandwidth of the user cannot satisfy the current resource request, and/or, the currently distributable bandwidth of the transmission layer cannot satisfy the current resource request, then the resource request shall be refused;

607: A-RACF transmitting a resource request refusing message to SPDF, wherein the message carries the currently available bandwidth information of the user;

The above currently available bandwidth information may be the minimum among the remaining subscription bandwidth of the user and the distributable bandwidth of the transmission layer.

608: SPDF transmitting a resource request refusing message to AF, wherein the message also contains the above available bandwidth information;

609: after receiving the above resource request refusing message, AF extracting the currently available bandwidth information of the user contained in the message, and reinitiating session negotiation according to the information, this flow ending.

Besides reinitiating session negotiation according to the available bandwidth information after receiving the above resource request refusing message, AF can also refuse the service request of the user, which comprises the following steps 610 and 611 specifically:

610: after receiving the above resource request refusing message, AF extracting the currently available bandwidth information of the user contained in the message and including the information into the service request refusing message, and transmitting the message to UE;

611: after receiving the above service request refusing message, UE determining the QoS parameters again and reinitiating session negotiation according to the currently available bandwidth information contained in the message.

Based on the basic principle of the present invention, various modifications can be made to the above examples, for example:

the remaining subscription bandwidth of the user and the distributable bandwidth of the transmission layer can be both contained in the above available bandwidth information.

INDUSTRIAL APPLICABILITY

To sum up, in the method of the present invention, QoS resource control can be optimized, the current resource status can be acquired when service control function fails in resource application, and negotiation on QoS can be restarted according to the current resource status, so as to perform service access rapidly and efficiently and to provide better services for the user.

What I claim is:

1. A method for processing a resource request in a next generation network, comprising:

after receiving a service request sent by a user, a service control layer in the next generation network sending a corresponding resource request to a resource and admission control layer; and if a bandwidth applied in the resource request cannot be satisfied, the resource and admission control layer including available bandwidth information into a corresponding resource request refusing message when refusing the request, and transmitting the resource request refusing message to the service control layer;

wherein, if the resource request cannot be satisfied only with remaining subscription bandwidth of the user, the available bandwidth information comprises: a bandwidth value of the remaining subscription bandwidth;

if the resource request cannot be satisfied only with distributable bandwidth of a transmission layer, the available bandwidth information comprises: a bandwidth value of the distributable bandwidth of the transmission layer;

if the resource request cannot be satisfied with both remaining subscription bandwidth of the user and distributable bandwidth of the transmission layer, the available bandwidth information comprises: a bandwidth value of the remaining subscription bandwidth and a bandwidth value of the distributable bandwidth of the transmission layer, or the minimum bandwidth value among the bandwidth value of the remaining subscription bandwidth and the bandwidth value of the distributable bandwidth of the transmission layer.

2. A method of claim 1, further comprising:
the service control layer and the user performing session negotiation on a corresponding service according to the available bandwidth information.

3. A method of claim 2, wherein after receiving the resource request refusing message, the service control layer determines quality of service (QoS) parameters according to the available bandwidth information and initiates session negotiation corresponding to the service request.

4. A method of claim 2, wherein after receiving the resource request refusing message, the service control layer transmits the resource request refusing message containing the available bandwidth information to the user; the user determines quality of service (QoS) parameters according to the available bandwidth information and initiates session negotiation corresponding to the service request.

5. A method of claim 1, wherein,
the remaining subscription bandwidth comprises: remaining upstream subscription bandwidth and remaining downstream subscription bandwidth;
the distributable bandwidth of the transmission layer comprises: upstream distributable bandwidth of the transmission layer and downstream distributable bandwidth of the transmission layer.

6. A method of claim 5, wherein,
the service control layer is a service control function (SCF), and the resource and admission control layer is a resource and admission control function (RACF) system;
before the resource request refusing message is transmitted to the SCF, the method comprises the following steps of:
A: after receiving the service request initiated by the user, the SCF transmitting a corresponding resource request to a policy decision-function entity (PD-FE) of the RACF system;
B: the PD-FE obtaining subscription information of the user and judging whether the resource request can be satisfied or not according to the subscription information; if the remaining subscription bandwidth of the user is smaller than the bandwidth required by the resource request, then including the remaining subscription bandwidth in the resource request refusing message as available bandwidth information.

7. A method of claim 5, wherein,
the service control layer is a service control function (SCF), and the resource and admission control layer is a resource and admission control function (RACF) system;
before the resource request refusing message is transmitted to the SCF, the method comprises the following steps of:
A1: after receiving the service request initiated by the user, the SCF transmitting a corresponding resource request to a policy decision-function entity (PD-FE) of the RACF system;
B1: the PD-FE obtaining subscription information of the user and transmitting a transmission layer resource request corresponding to the resource request to a transport resource control-function entity (TRC-FE) of the RACF system;
C1: if the distributable bandwidth of the transmission layer cannot satisfy the transmission layer resource request, the TRC-FE including bandwidth value of the distributable bandwidth of the transmission layer into a transmission layer resource request response, and then transmitting the transmission layer resource request response to the PD-FE;
D1: if the remaining subscription bandwidth of the user is smaller than a bandwidth required by the resource request, then the PD-FE including the remaining subscription bandwidth of the user, or both the remaining subscription bandwidth of the user and the distributable bandwidth of the transmission layer, or the minimum value among the remaining subscription bandwidth of the user and the distributable bandwidth of the transmission layer into the resource request refusing message as available bandwidth information; otherwise, the PD-FE including the distributable bandwidth of the transmission layer into the resource request refusing message as available bandwidth information.

8. A method of claim 5, wherein,
the service control layer is an application function (AF), and the resource and admission control layer is a resource and admission control subsystem (RACS) system;
before the resource request refusing message is transmitted to the AF, the method comprises the following steps of:
a) after receiving the service request initiated by the user, the AF transmitting a corresponding resource request to an access-resource and admission control function (A-RACF) through a service-based policy decision function (SPDF) of the RACS system;
b) the A-RACF making an admission decision according to subscription information of the user and resource status of the transmission layer;
if the remaining subscription bandwidth of the user cannot satisfy the resource request, or currently distributable bandwidth of the transmission layer cannot satisfy the resource request, then including the minimum bandwidth value among the remaining subscription bandwidth of the user and the distributable bandwidth of the transmission layer in the resource request refusing message as available bandwidth information;
if the remaining subscription bandwidth of the user cannot satisfy the resource request, and the currently distributable bandwidth of the transmission layer cannot satisfy the resource request, then including both the remaining subscription bandwidth of the user and the distributable bandwidth of the transmission layer, or the minimum bandwidth value among the remaining subscription bandwidth of the user and the distributable bandwidth in the resource request refusing message as available bandwidth information.

* * * * *